Feb. 6, 1934. E. R. SMITH ET AL 1,946,429
AUTOMATIC LATHE
Filed Jan. 28, 1931 6 Sheets-Sheet 4
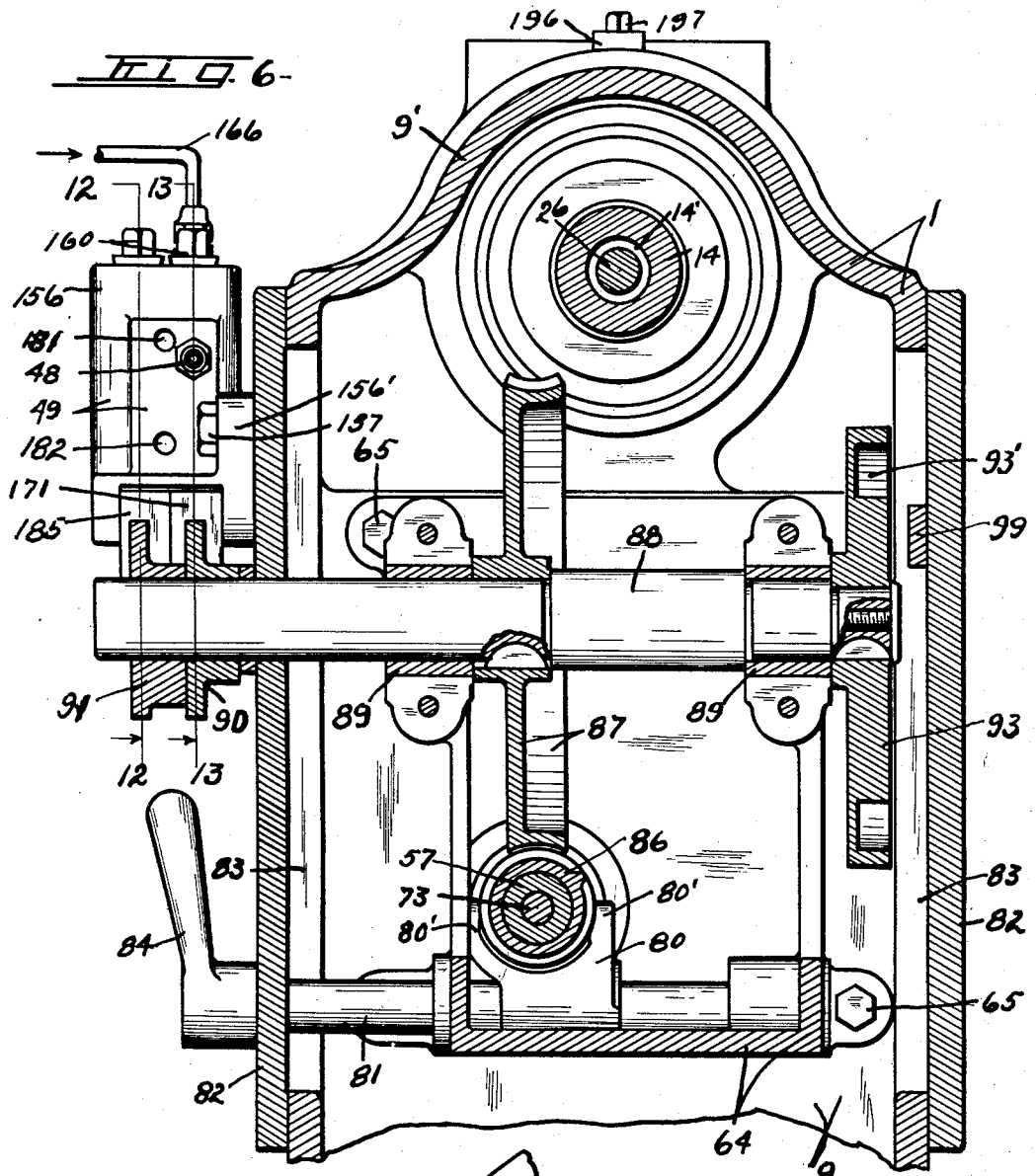
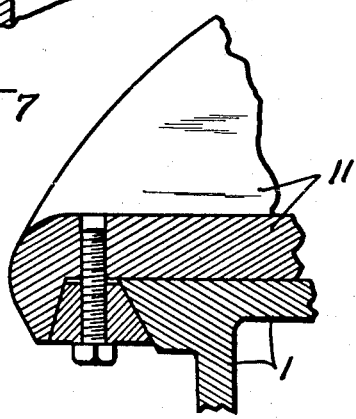
WITNESS
J. F. Mains
INVENTOR
Edwin R. Smith
and Albert Shinkey
BY Denison & Thompson
ATTORNEYS Feb. 6, 1934.  E. R. SMITH ET AL  1,946,429
AUTOMATIC LATHE
Filed Jan. 28, 1931  6 Sheets-Sheet 5
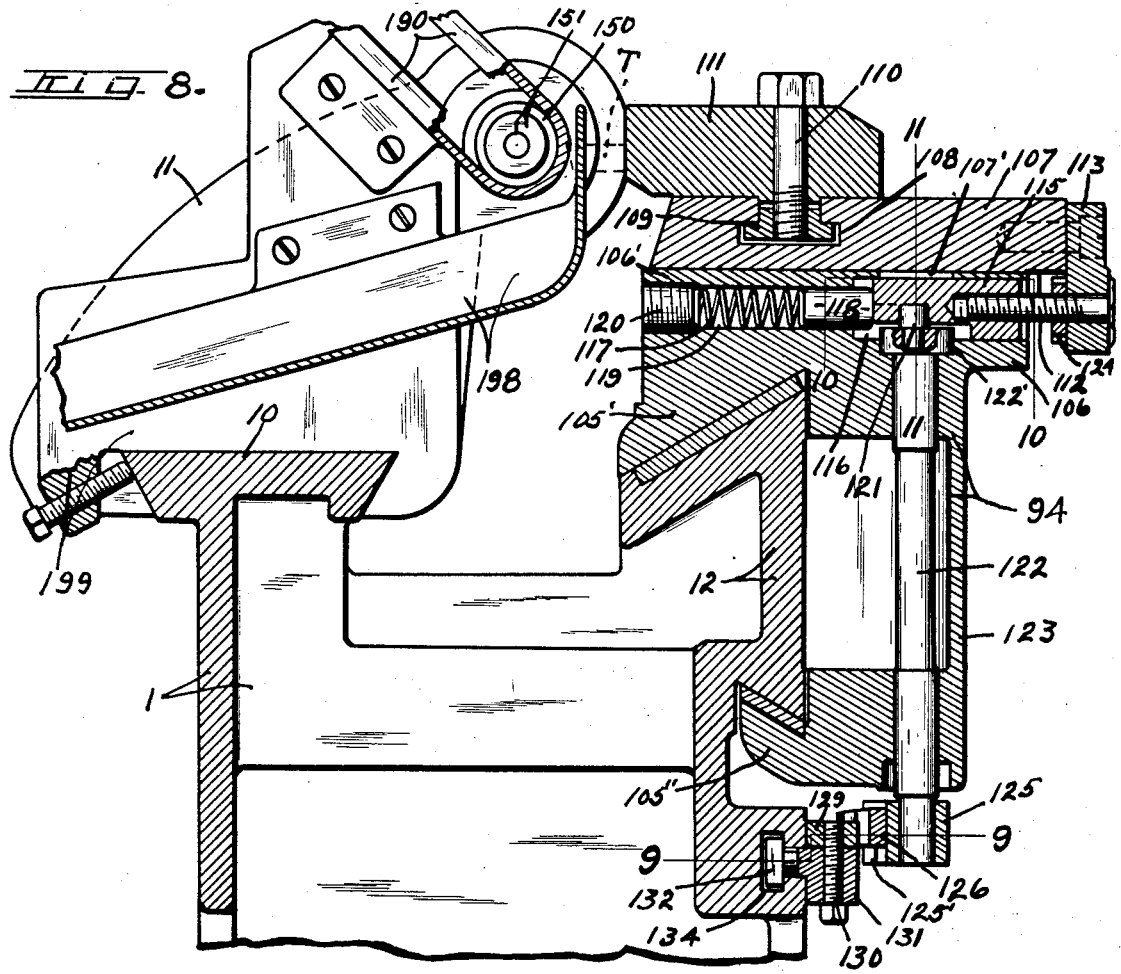
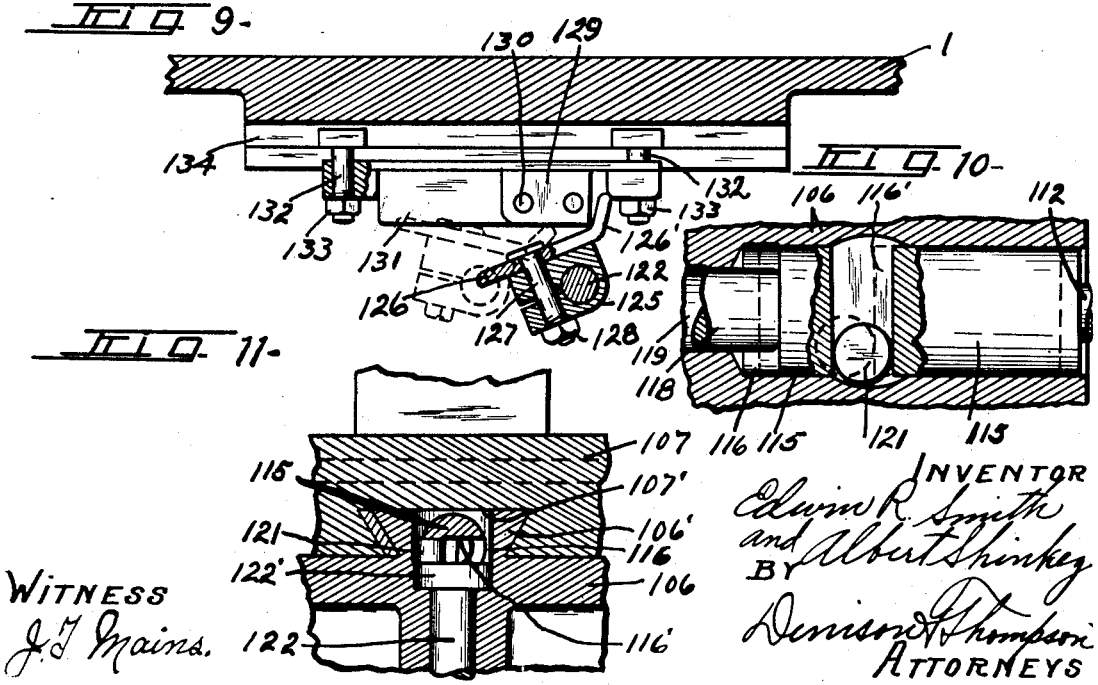
WITNESS
J. T. Mains.
INVENTOR
Edwin R. Smith
and Albert Shinkey
BY
Denison & Thompson
ATTORNEYS

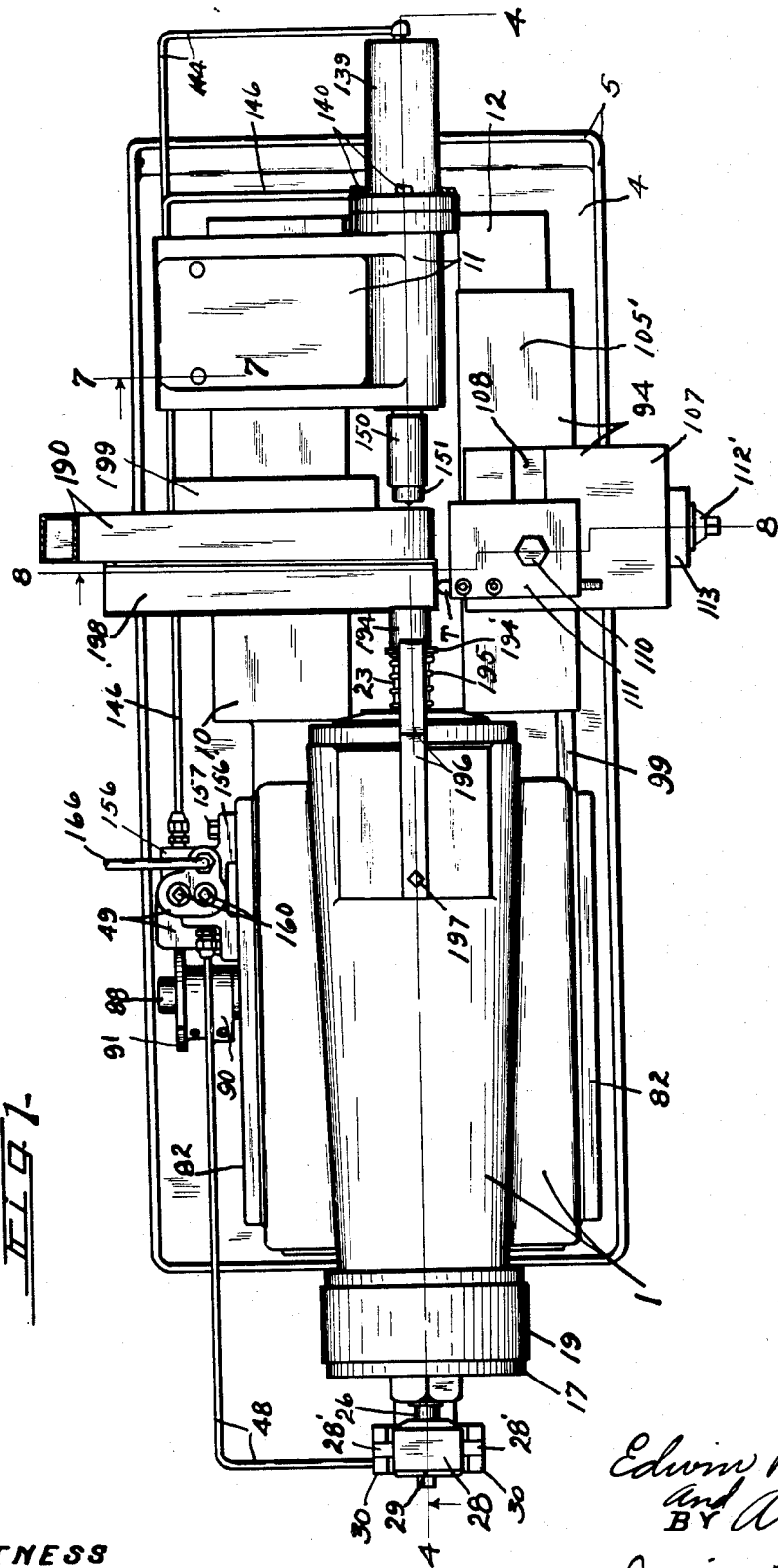

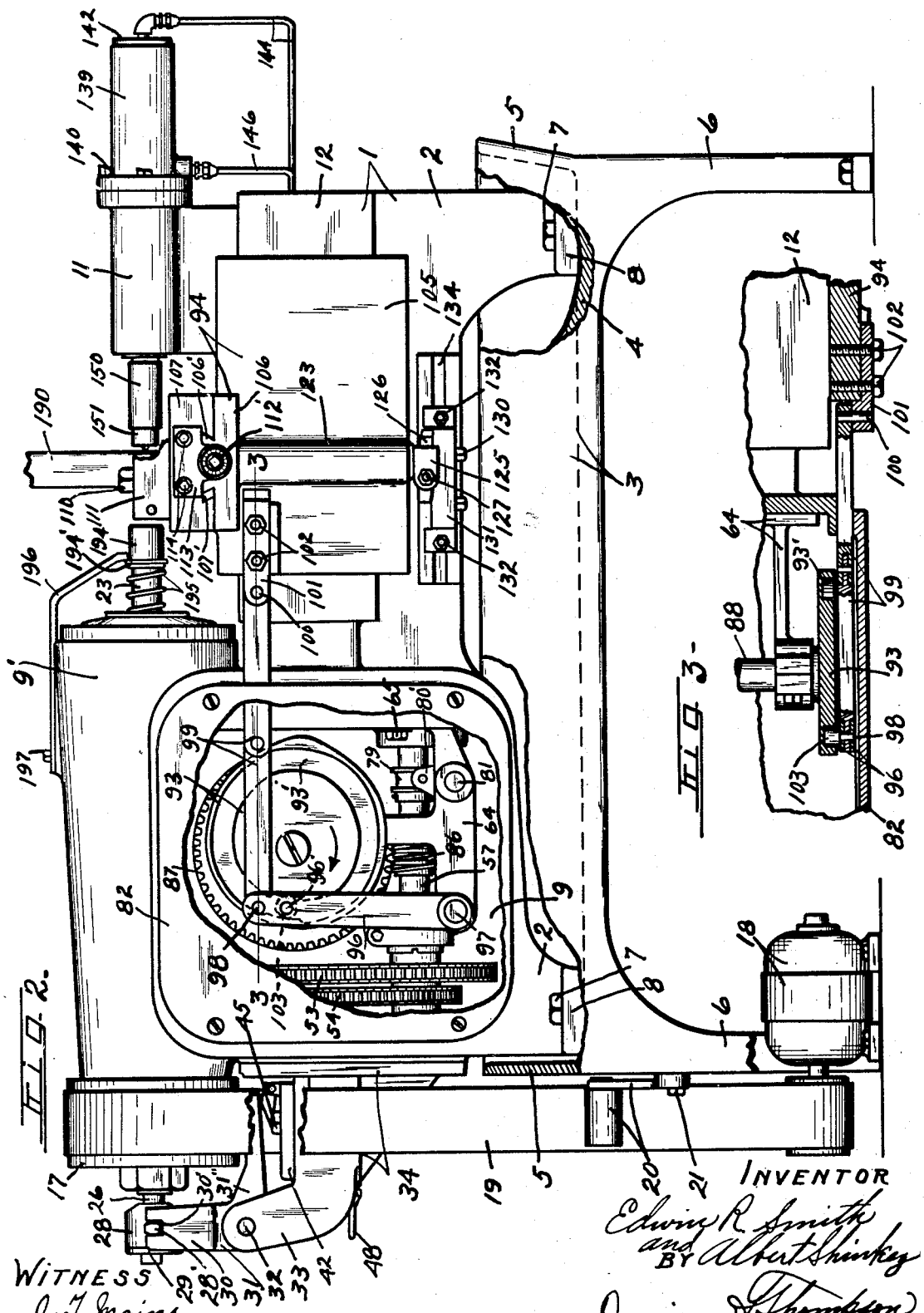

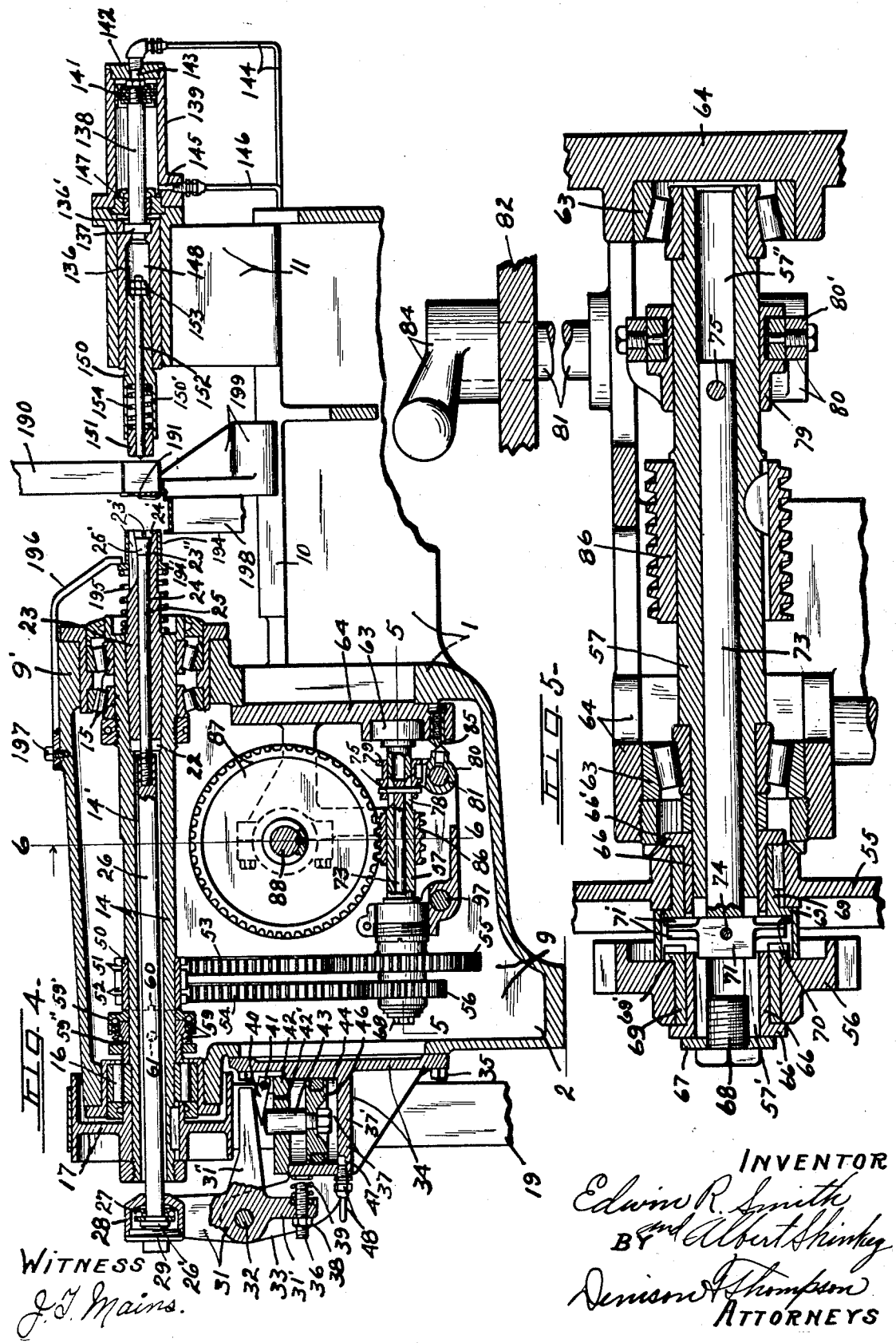

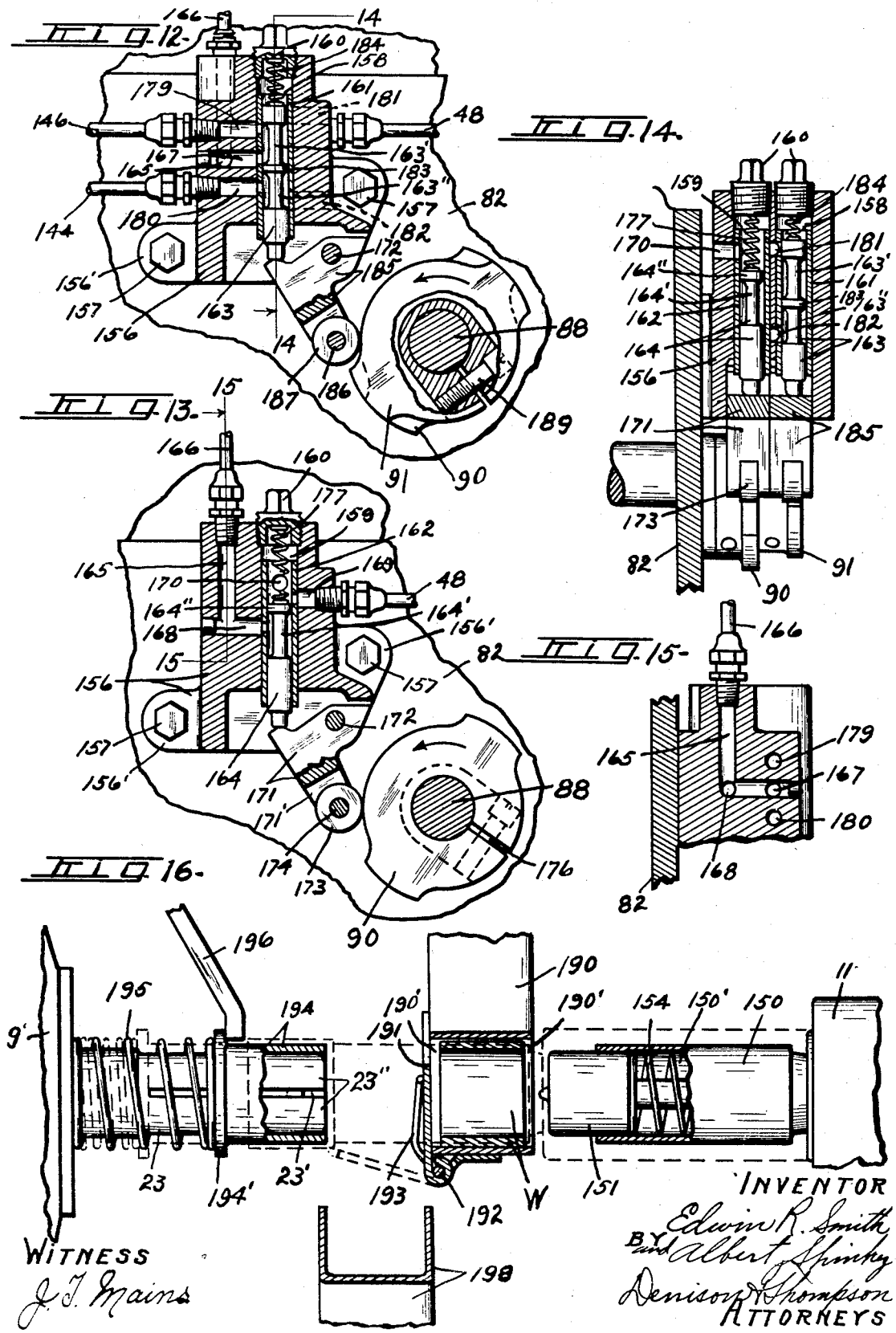

Patented Feb. 6, 1934

1,946,429

UNITED STATES PATENT OFFICE 1,946,429

AUTOMATIC LATHE

Edwin R. Smith and Albert Shinkez, Seneca Falls, N. Y., assignors to Seneca Falls Machine Company, Seneca Falls, N. Y., a corporation of Massachusetts Application January 28, 1931. Serial No. 511,798

5 Claims. (Cl. 82—2)

This invention relates to certain new and useful improvements in automatic lathes in which the work is automatically fed onto a work spindle which grips the work during the operation thereon by a tool or tools and after this operation is performed, the work is released by the spindle and ejected from the machine.

The mechanism herein shown and described is particularly adapted to machine the outer peripheral surface of small bronze bushings such as may be used for bearing members in connecting rods or the like, although it is evident that numerous other articles of manufacture may be successfully treated by certain minute changes in the construction of the mechanism without departing from the spirit of this invention.

The main object of this invention is to produce an apparatus of the above mentioned class that is very rapid, positive and accurate in operation and which may be durably and economically constructed.

Other objects and advantages relating to the detail of the structure and the form and relation of the parts thereof will more fully appear from the following description, taken in connection with the accompanying drawings in which:

Figure 1 is a top plan of an apparatus embodying the various features of this invention.

Figure 2 is a side elevation of the machine as illustrated in Figure 1 with portions thereof broken away to better disclose some of the working construction thereof.

Figure 3 is a detail sectional view taken in the plane of the line 3—3, Figure 2.

Figure 4 is a longitudinal vertical sectional view taken on line 4—4, Figure 1.

Figure 5 is an enlarged detail sectional view of the clutch shaft taken in the plane of the line 5—5, Figure 4.

Figure 6 is an enlarged transverse vertical sectional view taken in the plane of the line 6—6, Figure 4.

Figure 7 is an enlarged detail sectional view taken on line 7—7, Figure 1.

Figure 8 is an enlarged transverse vertical sectional view through the tool-supporting carriage taken on line 8—8, Figure 1.

Figures 9, 10 and 11 are detail sectional views taken respectively on lines 9—9, 10—10 and 11—11, Figure 8.

Figures 12 and 13 are detail vertical sectional views through the air control valve taken respectively on lines 12—12 and 13—13, Figure 6.

Figure 14 is a transverse vertical section taken on line 14—14, Figure 12.

Figure 15 is a detail sectional view taken on line 15—15, Figure 13.

Figure 16 is an enlarged detail face view, partly in section, of the adjacent portions of the work spindle, tail stock center plunger and work chute or hopper, illustrating the manner in which the work is automatically handled by the machine.

The apparatus, as illustrated in the drawings, consists of substantially a rectangular frame or bed 1 having a suitable integral leg 2 positioned at each corner thereof adapted to be secured to a convenient supporting member as the floor of the room, in which the machine is located, a bench, or as shown in Figure 2 of the drawings, the frame 1 may be supported upon an auxiliary supporting frame 3.

This supporting frame 3, in this instance, consists of a base plate 4, substantially rectangular in plan view, and which is provided with marginal upwardly extending sides 5 forming a convenient receptacle for catching excess oil, chips, etc. The bed plate is also provided with downwardly extending sides or legs 6 for supporting said plate.

The lathe frame 1 may be secured to the supporting frame 3 in any suitable manner as by bolts or screws 7 passing through registering hole provided in the base plate 4 and in lateral feet 8 formed at the lower ends of the legs 2. The lathe frame 1 is also provided at one end with a gear chamber 9 for encasing substantially all of the rotating elements of the apparatus, while the other end of the frame has the upper surface thereof provided with a suitable longitudinally disposed guideway 10 positioned at one side thereof for supporting the tail stock as 11 and a similarly constructed guideway 12 which extends longitudinally of the frame along the opposite side thereof for slidably supporting the tool carriage 94.

The tail stock 11 and the tool carriage 94 will hereinafter be more fully described.

The gear chamber 9, in this instance, extends some distance above the tail stock guide 10 to form the head stock as 9' which has rotatably mounted therein, a tubular drive shaft 14. This drive shaft extends through the chamber longitudinally of the frame and has the ends thereof journaled in suitable roller bearings 15 and 16 mounted in the vertical wall of the head stock 9' at the inner and outer sides thereof respectively.

The drive shaft 14 extends outwardly beyond the bearing member 16 and has secured thereto to rotate therewith a drive pulley 17. The drive shaft 14 may be driven from any suitable source of power, as by an electric motor 18 which may be mounted in or beneath the supporting frame 3 and is connected with the drive pulley 17 by a belt 19.

A suitable tension arm as 20 may be pivotally mounted at 21 to the adjacent portion of the supporting frame 3 for maintaining the belt 19 at the desired tension while in operation. The other or inner end of the drive shaft 14 is provided with a tapered opening 22 arranged co-axially therewith for receiving the correspondingly tapered end of a mandrel or spindle 23 which is frictionally positioned in said opening to rotate with the shaft 14.

The other end of the spindle 23 extends outwardly beyond the shaft 14 and has the end portion of slightly less diameter than the diameter of the interior of the bushing or work to be machined for receiving said work thereon. This end of the spindle 23 is also provided with a plurality of, in this instance, three radial slots 23' which extend inwardly from the end of the spindle and are in communication with a bore 24 to form chuck jaws as 23'' for gripping the work in a manner hereinafter described.

The bore 24 extends through the spindle 23 coaxially therewith and has the outer end thereof tapering outwardly to form an inwardly projecting conical opening 24', for receiving a correspondingly tapered end 25' of a chuck-actuating spindle 25 which extends inwardly through the bore 24 into a longitudinal bore 14' provided in the drive shaft 14 co-axially therewith.

The spindle 25 is connected with the inner end of a chuck-actuating spindle 26 which extends outwardly through the bore 14' beyond the outer end of the shaft 14 and has the outer end thereof terminating in an enlarged annular head 26'.

Mounted on the spindle 26 adjacent the inner face of the head 26' is a thrust bearing 27 which has the inner face thereof engaged by the inner wall of a thrust bearing cage 28. This thrust bearing cage is a cup-shaped member having an opening in its bottom wall for receiving the spindle 26 therethrough and has its open end closed by a nut 29 screw-threaded therein and which is adapted to engage the outer end surface of the spindle head 26' so that the spindle head is firmly held between the nut 29 and the thrust bearing 27 for movement with the thrust bearing cage 28.

The cage 28 is also provided with a pair of lateral lugs 28' which extend from diametrically opposite sides of the cage. The outer ends of the lugs 28' are positioned in slots 30' provided in respective upper ends 30 of a bifurcated clutch operating yoke 31.

The yoke 31 is mounted between and pivotally connected at 32 to a pair of spaced upwardly extending arms 33 which, in this instance, are made integral with a cylinder bracket 34 which is secured by screws 35 to the frame 1.

The yoke 31 is provided with a lug 31' which extends downwardly below the pivot 32 and has screw-threaded in the lower end thereof a stop screw 36, the inner end of which is adapted to engage the adjacent face of the wall of a cylinder 37 carried by the cylinder bracket 34 for limiting the outward movement of the upper end of the yoke 31 and, therefore, the thrust bearing cage 28.

The screw 36 may be adjustably maintained in the lug 31' at a predetermined position by means of a lock nut 38 screw-threaded on the outer end of the screw 36. A coiled spring 39 is mounted on the inner end of the screw 36 between the lug 31' and the cylinder 37 for yieldingly maintaining the yoke 31 and the thrust bearing cage 28 and therefore the chuck-operating spindle 25 in the innermost or inoperative position.

The yoke 31 is provided for effecting a longitudinal reciprocative movement of the spindles 26 and 25 for operating the chuck jaws 23'', and for this purpose the yoke is provided with an actuating arm 31'' which extends inwardly from one side of the yoke at substantially right angles thereto for engagement with a rock arm 40 pivotally mounted at 41 upon the upper cylinder end plate 42 and which extends over the outer end of a piston rod 43 to be actuated thereby.

The piston chamber 44 of the cylinder 37, in this instance, is a vertically disposed annular recess extending downwardly from the upper end of the cylinder 37. The lower end of the piston chamber is closed by the bottom wall 37' of the cylinder and the upper open end of the chamber is closed by the cover plate 42 which may be secured in place by any suitable means as by screws 45.

The piston rod 43 extends vertically downwardly through a suitable opening provided in the center of the cover plate 42 into the piston chamber 44 and has the inner end thereof secured to a piston 46 mounted for vertical reciprocative movement in said chamber.

The lower end of the piston chamber 44 is provided with a port 47 which is connected by a suitable conduit 48 with a fluid control valve 49 which will hereinafter be more fully explained.

It is now evident that if fluid under pressure be admitted through the port 47 to the piston chamber below the piston 46, said piston will be moved upwardly thereby which will rock the yoke 31 about the pivot 32 against the action of the spring 39 through the medium of the rock arm 41 and yoke arm 31''. This rocking movement of the yoke will cause the chuck jaws 23'' to operate to grip and release the work in a manner hereinafter more fully explained.

As the pressure in the piston chamber 44 is released, the piston 46 and yoke 31 will be returned to the normal inoperative position by the spring 39 and to facilitate the free upward and downward movement of the piston 46, the cover plate 42 is provided with one or more relatively small bleed holes 42' extending therethrough.

Mounted on the drive shaft 14 within the gear chamber 9 is a gear member 50 which has the periphery thereof provided with a plurality of, in this instance, two sets of sprocket teeth 51 and 52 having the same pitch diameter and which are connected by chain belts 53 and 54 with respective sprocket gears 55 and 56 mounted on a clutch shaft 57 journaled in the lower portion of the gear chamber 9 in longitudinal parallel relation with the drive shaft 14.

It is desirable that the motion of the clutch shaft 57 be yieldingly applied thereto from the drive shaft 14 and for this reason, the gear member 50 is rotatably mounted upon the drive shaft 14 and is yieldingly driven thereby by a friction clutch member 59 which has one portion 59' thereof splined to the gear 50 at 60 while the other portion 59'' of the drive clutch is secured to the drive shaft 14 to rotate therewith in any suitable manner as by a set screw 61.

The clutch shaft 57 is mounted in suitable spaced roller bearing members 63 mounted in a bearing supporting bracket 64 which is secured by screws 65 to the wall of the chamber 9.

The sprocket gears 55 and 56, in this instance are unequal in pitch diameter and are each rotatably mounted in spaced relation upon the outer end of the clutch shaft 57 in the following manner (see Fig. 5): A pair of bearing members 66 having their outer ends provided with an outwardly extending annular flange 66' are mounted upon the outer end of the clutch shaft 15 in longitudinal spaced relation and are maintained against displacement by means of a washer 67 mounted on a screw 68 which is screw-threaded in the outer end of the clutch shaft 57. Rotatably mounted upon the bearing members 66 is a pair of clutch members 69 which are also mounted in a respective gear member 55 and 56. These clutch members 69 have a key and slot connection with the respective gear members so as to rotate therewith.

The inner faces of the clutch members 69 terminate in spaced relation and are provided with outwardly extending annular flanges 69' adapted to engage the adjacent inner faces of the gear members and are provided with clutch teeth 70 formed in the outer vertical face thereof.

Mounted between the members 69 is a movable clutch member 71 which extends diametrically through a suitable slot 57' provided in the outer end of the clutch shaft 57. The outer ends of this clutch member 71 project beyond the periphery of the shaft 57 and are provided with clutch teeth 71' adapted to engage the clutch teeth 70 mounted on the respective gear members 55 and 56.

The shaft 57 is provided with a bore 57'' extending longitudinally therethrough and co-axially therewith. In this bore 57'' is slidably mounted a clutch-actuating rod 73 which has one end thereof secured by a pin 74 to the movable clutch member 71.

The rod 73 extends inwardly from the clutch member 71 to near the opposite end of the shaft 57 and has secured to the inner end thereof a pin 75 which extends outwardly from the rod 73 through diametrically opposite slots 78 provided in the walls of the clutch shaft 57. Mounted on the outer ends of the pin 75 is a grooved collar 79 which is slidably mounted on the shaft 57 for transmitting motion to the rod 73 to bring the clutch member 71 from engagement with one of the clutch members 69 secured to one of the gears into engagement with the clutch members 69 connected with the other gear.

The collar 79 may be actuated in any suitable manner as by a yoke 80 mounted on a horizontally disposed rock shaft 81 which extends transversely of the machine below the drive shaft 75. The yoke 80 is provided with a pair of upwardly extending arms 80' which have a pin and roller connection with the clutch collar 79.

One end of the shaft 81 extends outwardly through one of the cover plates 82 provided for openings 83 formed for the gear chamber 9. A convenient operating handle as 84 may be secured to the outer end of the rock shaft 81 for actuating the same.

It is now evident that both of the gear members 55 and 56 will be rotated at different speeds by the shaft 14 through the medium of the clutch member 59, gear member 50 and belts 53 and 54, and that the clutch shaft 57 may be driven at one of two speeds by means of manipulating the handle 84 to actuate the rod 73 to bring the clutch member 71 into engagement with one or the other of the clutch teeth provided on the gears 55 and 56. Said clutch is releasably maintained in engagement with the teeth 70 by means of a spring-actuated pin 85 mounted in the frame 64 and frictionally engaging the yoke 80.

Mounted on the clutch shaft 57 intermediate the bearings 63 and secured thereto to rotate therewith is a worm member 86 which has meshing engagement with a worm gear 87 secured to a cam shaft 88. The cam shaft 88 is mounted in a horizontal plane transversely of the machine above the clutch shaft 57 and journaled in suitable spaced bearings 89 which are secured to or made integral with the gear-supporting bracket 64.

One end of the shaft 88 extends outwardly through the cover plate 82 through which the rock shaft 81 extends and has secured thereto a pair of fluid-actuating valve cams 90 and 91 which will hereinafter be more fully explained.

The other end of the cam shaft 88 terminates inside of the opposite wall of the gear chamber 9 and has secured thereto to rotate therewith a carriage-actuating cam 93 adapted to reciprocate the tool carriage 94 slidably mounted upon the carriage guideway 12 in the following manner: A vertically disposed rock arm 96 is mounted at one side of the axis of the cam shaft 88 with the lower end thereof rotatably mounted on a screw stud 97 secured to the gear-supporting frame 64 below the clutch shaft 57.

The arm 96 extends upwardly from the pivot 97 above the horizontal plane passing through the axis of the cam shaft 88 and has the upper end thereof pivotally connected at 98 to one end of a jointed connecting rod 99 which extends rearwardly through a suitable opening provided in the inner wall of the gear chamber 9 and has the other end thereof pivotally connected at 100 at one end of a pull strap 101 which is secured to the carriage 94 by means of screws 102. The rock arm 96 is also provided with an inwardly projecting pin 96' positioned below the pivot 98 and which has rotatably mounted thereon a roller 103 adapted to travel in the cam groove 93' so that as the cam 93 is rotated, the arm 96 will be rocked about the pivot 97 and thereby transmit a reciprocative movement of the carriage 94 through the medium of the connecting rod 99 and strap 101.

The carriage 94, in this instance, is composed of a substantially flat rectangular body 105 disposed in a vertical plane adjacent the outer face of the guideway 12.

The body 105 has the upper and lower longitudinal edges thereof extending inwardly to form supporting flanges 105' and 105'' respectively. The inner opposed faces of these flanges are beveled to conform to the beveled edges of the guideway for slidably maintaining the carriage thereon.

Across the upper edge of the body 105 and extending transversely thereof is an integral relatively small rectangular guide block 106 which has the upper surface thereof disposed in a substantially flat horizontal plane. Extending longitudinally of the guide block 106, that is, in a direction transversely of the frame 1, is an upwardly extending flange 106' which has the opposite longitudinal edges thereof beveled downwardly and inwardly to form a suitable guideway for a cross slide 107.

This cross slide 107 is a flat substantially rectangular member in plan view having the undersurface thereof provided with a longitudinally extending slot 107' which has the opposite longitudinal walls thereof beveled to correspond to the beveled edges of the guide flange 106' for receiving said flange therein.

The upper surface of the cross slide 107 is provided with a T-slot 108 which extends transversely of the slide 107 for receiving a T-nut 109. The T-nut 109 cooperates with a bolt 110 positioned in a suitable opening in a tool-supporting member 111 for adjustably securing the tool-supporting member to the slide 107.

It is necessary, when the carriage 94 and the tool as T carried thereby are in the extreme out position, that the tool be moved outwardly out of the path of movement of the work during the placement thereof upon the mandrel 23 as will be more apparent as we continue with the explanation. For this purpose, the cross slide 107 is slidably mounted on the guide block 106.

It is also necessary that the cross slide 107 with the tool secured thereto, be adjustable relative to the work so that the tool T may be positioned in proper working relation with the work and, for this purpose, an adjusting screw 112 extends through a suitable opening formed in the lower end of a bracket 113 which is secured to the outer end of the cross slide 107 by screws 114.

The inner end of the screw 112 is screw-threaded into the outer end of a slide adjusting nut 115, which in this instance, is slidably mounted in a recess 116 provided in the outer end of the guide block 106. The outer end of the screw 112 is provided with a head 112' which has the outer edge thereof provided with graduated marks to assist in determining the correct position of the cross slide 107 and the tool T relative to the work.

The nut 115 is yieldingly maintained in an outward position by a spring 117 and a plunger 118 positioned in a bore 119 extending inwardly in the guide block 106 from the inner end of the recess 116, the plunger 118 being positioned adjacent the inner end of the nut 116 while the spring 117 is positioned between the plunger 118 and a nut 120 screw-threaded in the outer end of the bore 119. The outward movement of the nut 116 is limited by a pin 121 secured in the upper end of a vertically disposed cam shaft 122 and has the upper end thereof positioned in a slot 116' extending transversely across the bottom face of the nut 115.

The cam shaft 122 is journaled near its ends in a suitable cylindrical housing 123 formed integral with the outer vertical face of the body 105 of the carriage 94. The upper end of the shaft 122 is provided with an enlarged annular flange or head 122' and the pin 121 is mounted in the head 122' eccentric therewith so that any rotating movement of the shaft 122 will impart a corresponding longitudinal movement of the nut 115 and, therefore, a similar movement to the cross slide 107 and the tool T secured thereto through the medium of the adjusting screw 112 which, in this instance, is secured to the slide 107 to prevent relative longitudinal movement thereof by means of a lock nut 124 screw-threaded on the screw 112 and positioned adjacent the inner face of the bracket 113, it being understood that the head 112' is positioned adjacent the opposite or outer face of said bracket so that the bracket is clamped between the head 112' and the nut 124 by the manipulation of the nut 124, after the slide 107 has been properly adjusted.

It will also be observed that this manipulation of the nut 124 also maintains the screw 112 against being accidentally rotated after the slide 107 has been adjusted.

The shaft 122 may be rotated at the desired position of the carriage 94 by any suitable means and, for this purpose, the shaft is extended a short distance below the body 105 of the carriage 94 and has adjustably secured thereto a finger-supporting bracket 125.

Across the inner vertical face of the bracket 125 is positioned an operating finger 126 which rests against a supporting lug 125' formed on the forward lower edge of the inner face of the bracket 125. The bracket 125, in this case, is provided with a vertical opening therethrough for receiving the lower end of the shaft 122 and has one side thereof split from the opening to the outer face thereof. The bracket and the finger 126 are secured together and to the shaft 122 by means of a clamping bolt 127 and nut 128, said bolt being positioned in registering openings in the finger and on the split side of the bracket 125.

The forward end 126' of the finger 126 is bent inwardly at an angle to the remaining portion of said finger and adapted to travel across the face of a hardened plate or template 129 secured by screws or pins 130 to the upper edge of a bracket 131.

The bracket 131 is adjustably secured to the frame 1 below the carriage 94, by means of a pair of bolts 132 and nuts 133, said bolts having the heads thereof positioned in a T-slot 134 formed in the adjacent portion of the frame 1. The bracket 131 is clamped to the frame 1 in such a manner that as the carriage 94 approaches the end of its outward stroke, the end 126' of the finger 126 will pass beyond the end of the template 129, as illustrated in Figure 9, thus permitting the cam shaft 122 to be rocked by the action of the spring 117 which causes the nut 115 to be moved outwardly which produces a corresponding outward movement of the cross slide 107 and, therefore, the tool T.

It is also evident that as the carriage 94 commences its return stroke, that the shaft 122 will be rotated due to the end 126' of the finger 126 traveling about the forward end of the template 129 into engagement with the outer face thereof. This rotation of the shaft 122 will cause the pin 121 to move the nut 116 inwardly against the action of the spring 117, thereby returning the cross slide 107 and the tool T to the normal working position.

The hereinbefore mentioned tail stock 11 has slidably mounted in the upper end thereof coaxially with the mandrel or spindle 23, a spindle 136 which has a T-slot 136' formed in the outer end thereof for receiving the head 137 of a piston rod 138 which extends rearwardly from the tail stock 11 into a cylinder 139 which is secured by screws 140 or their equivalent to the rear face of the tail stock 11.

The inner end of the rod 138 is secured to a piston 141 which is mounted for reciprocative movement in the cylinder 139. The outer end of the cylinder 139 is provided with an end plate 142 which, in turn, has a port 143 in communication with the interior of the cylinder and is also connected by a suitable conduit 144 to the hereinbefore mentioned fluid control valve 49. The other end of the cylinder 139 is also provided with a port 145 which is also connected with the fluid control valve 49 by a separate conduit 146.

A suitable stuffing box 147 is also provided in the inner end of the cylinder 139 for receiving the piston rod 138 therethrough and also preventing any leakage of fluid about the rod 138.

The spindle 136 is also provided with a longitudinal tapered bore 148 made concentric therewith for receiving a plunger-supporting member 150. This member 150 has one end thereof tapered for engaging the bore 148, and the other end is provided with a concentric bore 150' for receiving a center plunger 151 which is slidably mounted in said bore and has secured thereto a plunger rod 152 which extends outwardly through the bore 150' and through a relatively small opening which is formed in the plunger supporting member 150 between the bore 150' and the opposite end of said member.

The outward movement of the plunger 151 is limited by a pair of nuts 153 screw-threaded on the outer end of the rod 152. A spring 154 is positioned in the bore 150' between the inner end thereof and the inner end of the plunger 151 so as to yieldingly maintain the plunger in its outermost position.

The hereinbefore mentioned fluid control valve 49 as illustrated more particularly in Figures 6, 12, 13, 14 and 15, consists of a suitable body member 156 which, in this instance is provided with a pair of lateral ears 156' positioned one at either side thereof, and is secured to the cover plate 82 through which the cam shaft 88 extends, by means of screws 157 which pass through suitable openings in the ears 156' and are screw-threaded in said cover plate.

The valve body 156, in this instance, is provided with a pair of valve chambers 158 and 159 disposed in vertical spaced relation therethrough. The upper ends of each of the valve chambers 158 and 159 are closed by suitable plugs 160 screw-threaded therein. In each of the valve chambers 158 and 159 is positioned a hardened sleeve member 161 and 162 respectively. Each of these sleeve members has a longitudinal bore therethrough for receiving a respective control valve 163 and 164.

The valve body 156 is provided with an inlet port 165 which has one end thereof connected by a suitable conduit 166 to a suitable means for supplying fluid thereto under pressure such as a pump or a compression tank, not shown. This inlet port 165 is also in communication with the interior of the sleeve members 161 and 162 positioned in the valve chambers 158 and 159 by means of auxiliary ports 167 and 168 which, in this instance, communicate with said valve chambers substantially midway between the ends thereof. One of the valve chambers as 159 is also provided with an outlet port 169 positioned above the inlet port 168 and which is connected to the conduit 48.

It will be remembered that the conduit 48 is also connected with the lower end of the chuck-actuating cylinder 37 so that any fluid as air under pressure, entering the valve chamber 159 may flow through the port 169 and conduit 48 to the cylinder 37 for actuating the piston 46, providing the ports 168 and 169 are connected through said valve chamber 159 by the particular positioning of the control valve 164. For this purpose, the control valve 164 has the major portion thereof made with a close sliding fit in the sleeve 162, and a central portion 164' of the valve is reduced in diameter to form a by-pass around said valve so that with the valve in the lowermost position, as shown in Figure 13, the ports 168 and 169 are cut off from each other by the full size upper end as 164" of the valve 164 which, as shown is positioned between said ports 168 and 169. The outlet port 169, however, will be in communication with an exhaust port 170 which is connected with the valve chamber 159 above the outlet port 169 when the valve 164 is in the lowermost position.

The exhaust port 170 extends through the body 156 of the valve, with the outer end thereof in communication with the atmosphere.

It is now evident that if the valve 164 is lifted to bring the upper portion 164" thereof slightly above the outlet port 169, said outlet port will be cut off from the exhaust port 170 and brought into communication with the inlet port 168. This vertical movement of the valve 164 may be accomplished in any suitable manner, and for this purpose, the valve is made to extend downwardly below the valve chamber 159 and is engaged by a rock arm 171 which is pivotally mounted at 172 to the body 156 of the control valve.

The rock arm 171 is also provided with a roller 173 which is rotatably connected at 174 with a downwardly extending lateral projection 171' of the arm 171, said roller being positioned for engagement with the actuating cam 90 secured by a screw 176 to the outer end of the cam shaft 88. The roller 173 is yieldingly maintained in contact with the periphery of the cam 90 by a compression spring 177 positioned in the upper end of the valve chamber 159 between the respective plug 160 and the upper end of the valve 164.

It is also evident that the action of the spring 177 yieldingly maintains the valve 164 in its lowermost position in contact with the rock arm 171.

The valve chamber 158 and valve 163 are constructed similarly to the chamber 159 and valve 164 just described with the exception that the valve chamber 158 is provided with two outlet ports 179 and 180. One of these ports as 179 is positioned above the inlet port 167 as shown more clearly in Figure 12, and the other port 180 is positioned below said inlet port.

The chamber 158 is also provided with two exhaust ports 181 and 182 positioned respectively above and below the outlet ports 179 and 180. The valve 163 is provided with two intermediate portions 163' and 163" reduced in diameter, said reduced portions being separated by an annular flange or partition 183 of substantially the same diameter as the interior of the sleeve 161.

The partition 183 and reduced portions 163' and 163" are so related, that when the partition 183 is positioned between the inlet port 167 and one or the other of the outlet ports 179 or 180, the outlet port located at the same side of the inlet port at which the partition is located, will be in communication with the adjacent exhaust port, while the other outlet port will be cut off from its respective exhaust port by the adjacent end of the valve 163 and will be in communication with the inlet port 167.

The valve 163 is actuated upwardly against the action of a compression spring 184, similar to the spring 177 for the valve 164 by a rock arm 185 rotatably mounted on the pivotal rod 172 provided for the arm 171. The rock arm 185 has a pin 186 and roller 187 connection with the cam 91 secured by a screw 189 to the cam shaft 88 adjacent the cam member 90.

The upper positioned outlet port 179 is connected with the conduit 146 which, as hereinbefore described is connected with the inner or rod end of the plunger-actuating cylinder 139 while the other outlet port 180 is connected by the conduit 144 with the other or head end of the cylinder 139.

Operation

In operation, the work as W, Figure 16, may be successively fed in any suitable manner as by an inclined chute 190 into co-axial alignment with and adjacent to the inner end of the plunger 151. It will be understood that the plunger 151 when in its extreme outer or right hand position, is spaced some distance from the mandrel 23.

The portion of the chute 190 adjacent the plunger 151 has each side wall thereof provided with an opening 190' equal to or slightly greater in diameter than the work W for receiving the plunger 151 and permitting the work to pass therethrough. The opening 190' in the side of the chute adjacent the mandrel is normally closed by a gate 191 which, in this instance, is a thin metal plate hingedly connected at 192 to the chute 190 at one side of said opening, said gate being yieldingly maintained in a closed position by a tension spring 193 coiled about one end of the pivotal pin 192.

Assuming now, that the machine is set as illustrated in the drawings, that is, with the tool carriage 94 and therefore the tool T in the extreme outer or right hand position as illustrated in Figure 2 and with the air valves 163 and 164 in the position shown in Figures 12 and 13, the pistons 46 and 141 will be in the position shown in Figure 4 with the chuck-actuating spindle 25 in the innermost position which will permit the chuck jaws 23" to be in the normal contracted position and the plunger 151 in the normal extreme outer or right hand position.

Now assuming that the chute 190 has been filled with articles of work as the bushing W, Figure 16, it is evident that the lowermost bushing will be positioned coaxially with the plunger 151 and mandrel 23 and, therefore, in the path of movement of said plunger. Now by starting the motor 18, it is evident that the mandrel 23 will be continuously rotated by the drive shaft 14 which will also transmit motion to the cam shaft 88 through the medium of one or the other of the sprocket wheels 55 or 56 depending upon the position of the clutch member 71 and the clutch shaft 57, worm 86 and worm gear 87. This rotation of the cam shaft 88 will, of course, cause the rotation of the valve-actuating cams 90 and 91 which will first actuate the arm 185 and lift the valve 163 against the action of the valve spring 184. This movement of the valve 163 will cause the outlet port 180 to be connected through the valve chamber with the inlet port 167 which will admit fluid, as air under pressure through the conduit 144 to the outer end of the plunger actuating cylinder 139. This will cause the piston 141 and plunger 151 to move forwardly.

The plunger being of slightly less diameter than the interior of the bushing W, will enter said bushing, and as the edge of the bushing is engaged by the end of the plunger-supporting member 150, said bushing will be carried forwardly with the plunger and its support out of the chute 190 and onto the mandrel 23.

As the work and plunger 151 pass through the chute 190, the gate 191 will be rocked outwardly against the action of the spring 193 to permit said movement of the work and plunger. As the plunger 151 with the work thereon approaches the inner end of the mandrel 23, said plunger 151 will engage the inner or adjacent end of the mandrel 23, thus causing the plunger to come to an at rest position, while the plunger-supporting member 150 will continue its movement thereby pushing the work W from the plunger 151 onto the mandrel 23 which action is permitted by the spring 154 which will then be compressed to a greater or less degree.

As the work moves on to the mandrel 23, it will force an ejector sleeve as 194 outwardly along the mandrel against the action of a compression spring 195. As the plunger-supporting member 150 reaches the end of its inward stroke, the fluid control valve 164 will be moved upwardly in the valve chamber 159 by the action of the cam member 90 so that fluid under pressure will be admitted through the conduit 48 to the lower end of the cylinder 37, thereby causing the piston 46 to be moved upwardly which action will rock the chuck yoke 31 to move the upward end thereof outwardly and thereby cause the outward movement of the chuck-actuating spindle 25 which, in turn, will cause the chuck jaws 23" of the mandrel to be expanded and thereby grip the work W and hold said work on the mandrel so as to rotate therewith. As soon as the work has been secured on the mandrel, the control valve 163 will be released by the cam 91 permitting said valve to be returned by the action of spring 184 to the normal down position which will connect the outer end of cylinder 139 with the atmosphere through exhaust port 181 and admit fluid under pressure through the conduit 146 to the rod end of cylinder 139 which will cause the piston 141 and plunger 151 to be returned to the normal outer position.

During the movement of the plunger 151 in placing the work upon the mandrel 23, the tool carriage 94 will remain in a substantially stationary position due to the concentric portion of the cam groove 93'. As soon, however, as the work is gripped by the mandrel, the roller 96' of the arm 96 will have been engaged by the eccentric portion of the cam groove 93' which will cause the carriage 94 to begin its inward movement. This inward movement of the carriage will move the tool across the outer periphery of the work W and thereby perform the desired machining operation on the bushing W. It will be understood that when the carriage 94 is in the extreme outer position that the cross slide 107 and therefore the tool T will be in the outer or inoperative position as previously described and as the carriage 94 begins its inward movement and before the tool reaches the plane of the work W, the cross slide 107, together with the tool secured thereto, will be moved inwardly by the finger 126 being actuated by the template 129 as previously described. This action is due to the rotation of the shaft 122 causing the nut 115 to move inwardly against the action of spring 117. This inward movement of the cross slide 107 and the tool is sufficient to bring the cutting edge of the tool in operative relation with the work as the tool approaches the work so that as the carriage continues its inward travel the desired machining operation will be performed upon the work.

At about the time the carriage 94 reaches the end of its inward stroke, the fluid control valve 164 will be released by the cam 90 thereby permitting the spring 177 to move the valve 164 downwardly which action will shut off the fluid pressure to the cylinder 37 and connect said cylinder with the atmosphere through the ports 169 and 170 located in the piston chamber 159, relieving the pressure in the cylinder 37 and permitting the piston 46 to be returned by the action of the spring 39 and yoke 31 to its down position which, in turn, will cause the chuck spindle 24 to move inwardly and thereby permit the chuck jaws 23'' to return to their normal contracted position and release the work whereupon the work will immediately be ejected from the mandrel by the action of the spring 195 upon the ejector sleeve 194.

The outward movement of the ejector sleeve 194 may be limited by any suitable means such as an arm 196 secured by a screw 197 to the head stock 9', said arm having one end thereof extending in the path of movement of an outwardly extending annular flange 194' provided on the outer end of the ejector sleeve 194.

As soon as the plunger 151 and the plunger-supporting member 150 have been returned to their normal outer position, it is evident that the gate 191 will have been closed by the spring 193 and, therefore, the gate 191 will, when the work W is being ejected from the mandrel 23, be in the path of movement of said work so as to prevent the work from again being moved into the chute 190. This will cause the work to fall from axial alignment with the mandrel and plunger, and any suitable means may be utilized to carry the work from the machine such as a chute 198 which may be supported in any suitable means such as a bracket 199 mounted upon the guideway 10, as shown more particularly in Figure 8.

The machine will now be in substantially the same position as shown in the drawings and as described at the commencement of the operation thereof except that the tool carriage 94 will be in the extreme inner or left hand position.

As soon as the work has been ejected from the mandrel 24, the control valve 163 will again be actuated by the cam 91 to cause the plunger 151 and plunger-supporting member 150 to be moved inwardly for placing another work member upon the mandrel 23 in the same manner as previously described. As soon as the work has been gripped by the chuck jaws 23'', the carriage 94 will be actuated by the cam groove 93' to move outwardly. As soon as the carriage begins this outward return movement, the tool will again be moved across the face of the work to perform the machining operation thereon.

Before the carriage reaches the end of its outward movement and after the tool has passed beyond the work, the tool will again be moved outwardly from the cutting position by the rotation of the shaft 122 due to the end 126' of the finger 126 passing beyond the template 129 in the manner previously described.

As the carriage comes to rest at the extreme outer or right hand position, the tool T will be out of the path of movement of the next piece of work, as said work is being moved by the plunger 151 from the chute 190 onto the mandrel 23. As the carriage reaches this extreme outer position, the jaws will again be actuated to release the work which will then be automatically ejected by the action of the ejector sleeve 194 and spring 195 in the manner hereinbefore explained.

These cycles of operation may continue as long as work remains in the feed chute 190. It will thus be noted that the only manual labor necessary in operating this machine, is to provide the chute 190 with the work bushings as W, whereupon the machine will automatically load and unload the work upon the work-supporting mandrel and perform the desired machining operation thereon.

Although there has been shown and described the preferred embodiment of this invention, it is not desired to be limited to the exact construction shown, as various changes both in the form and the relation of the parts thereof may readily be made without departing from the spirit of this invention, as set forth in the appended claims.

We claim:

1. In a device of the class described in combination, a mandrel, a work carrier adapted to deposit work on said mandrel normally positioned in spaced relation thereto, work-supporting means positioned intermediate the mandrel and said carrier for successively feeding the work pieces into cooperative relation with the work carrier, automatically controlled means connected with the carrier for moving said carrier into and out of engagement with the mandrel, means for automatically ejecting the work from the mandrel, and a gate cooperating with the work holder adapted to permit the work to be carried from the holder to the mandrel and to prevent work ejected from the mandrel to enter said holder.

2. In a device of the class described, a mandrel adapted to releasably maintain a bushing thereon, a work carrier adapted to deposit bushings on said mandrel normally positioned in co-axial spaced relation thereto and comprising a plunger-supporting member adapted to engage the end of a bushing, a plunger adapted to extend into the central opening of the bushing for supporting said bushing slidably mounted in said supporting member to extend therefrom, a spring mounted in said supporting member for urging the plunger outwardly, means for limiting the outward movement of the plunger, and means for moving the work carrier into and out of engagement with the mandrel to deposit a bushing on said mandrel.

3. In a device of the class described, a mandrel adapted to releasably maintain a bushing thereon, a work carrier adapted to deposit bushings on said mandrel normally positioned in co-axial spaced relation thereto and comprising a plunger-supporting member adapted to engage the end of a bushing, a plunger adapted to extend into the central opening of the bushing for supporting said bushing slidably mounted in said supporting member to extend therefrom, means for yieldingly maintaining the plunger in its extended position, and means for moving the work carrier into and out of engagement with the mandrel to deposit bushings on said mandrel.

4. In a device of the class described, in combination with a revoluble mandrel adapted to releasably maintain a bushing thereon, of means for automatically feeding a bushing onto the mandrel, means for automatically ejecting the bushing from the mandrel, a chute adapted to feed bushings into operative alignment with said mandrel, and feeding means, said chute having openings in opposite side walls thereof for permitting the passing of the feeding means therethrough and a swinging gate movable across one of said openings to permit a bushing to be carried from the chute to the mandrel and to prevent a bushing ejected from the mandrel to enter said chute.

5. In a device of the class described, the combination with a mandrel adapted to support a bushing and a tool, of operating means for producing relative rotary movement of the tool and mandrel and a relatively reciprocative movement of said tool and mandrel parallel with the axis of the mandrel for machining the bushing on said mandrel, separate means for automatically moving the tool toward and from the bushing in a direction transversely to the axis of the mandrel at the end of said reciprocating movement, a work carrier comprising a plunger supporting member adapted to engage the end of the bushing, a plunger adapted to extend into the central opening of the bushing for supporting said bushing slidably mounted in said supporting member to extend therefrom, means for yieldingly maintaining the plunger in its extended position, and means for moving the work carrier into and out of engagement with the mandrel to deposit bushings on said mandrel when the tool is in the outermost transverse position.

EDWIN R. SMITH.
ALBERT SHINKEZ.